(12) United States Patent
Böttcher

(10) Patent No.: US 9,914,235 B2
(45) Date of Patent: Mar. 13, 2018

(54) METHOD FOR REMOVING A COATING

(75) Inventor: Uwe Böttcher, Stockholm (SE)

(73) Assignee: Nyfors Teknologi AB, Stockholm (SE)

( * ) Notice: Subject to any disclaimer, the term of this patent is extended or adjusted under 35 U.S.C. 154(b) by 1759 days.

(21) Appl. No.: 12/988,932

(22) PCT Filed: Apr. 22, 2008

(86) PCT No.: PCT/SE2008/050463
§ 371 (c)(1),
(2), (4) Date: Jan. 6, 2011

(87) PCT Pub. No.: WO2009/131500
PCT Pub. Date: Oct. 29, 2009

(65) Prior Publication Data
US 2011/0271807 A1 Nov. 10, 2011

(51) Int. Cl.
B26D 3/28 (2006.01)
B26D 7/08 (2006.01)
G02B 6/245 (2006.01)
H02G 1/12 (2006.01)

(52) U.S. Cl.
CPC ............. B26D 7/088 (2013.01); B26D 3/282 (2013.01); G02B 6/245 (2013.01); H02G 1/1253 (2013.01); H02G 1/1273 (2013.01); H02G 1/1287 (2013.01); Y10T 83/0443 (2015.04); Y10T 83/263 (2015.04)

(58) Field of Classification Search
CPC ........ B26D 3/282; B26D 7/088; G02B 6/245; H02G 1/12; H02G 1/1202; H02G 1/1209; H02G 1/1212; H02G 1/1214; H02G 1/1253; H02G 1/1256; H02G 1/1258; H02G 1/1273; H02G 1/1287; Y10T 83/0443; Y10T 83/263

USPC .............................. 81/9.41, 9.42; 83/22, 169
See application file for complete search history.

(56) References Cited

U.S. PATENT DOCUMENTS

| | | | | |
|---|---|---|---|---|
| 3,933,519 A * | 1/1976 | Koch et al. | ...................... | 134/34 |
| 5,010,797 A * | 4/1991 | Stepan | ..................... | 83/883 |
| 5,481,638 A | 1/1996 | Roll et al. | | |
| 5,542,327 A * | 8/1996 | Schultz | .......................... | 83/861 |
| 5,787,574 A * | 8/1998 | Watanabe | ........................ | 29/828 |
| 5,806,188 A * | 9/1998 | Caraballo | ...................... | 30/92.5 |
| 6,092,394 A * | 7/2000 | Backer et al. | .... | C03B 37/01211 65/377 |
| 6,249,631 B1 | 6/2001 | Le Vey et al. | | |
| 6,763,872 B2 * | 7/2004 | Beffroy et al. | ........ | G02B 6/245 156/703 |
| 6,799,383 B2 * | 10/2004 | Wiley | .................. | G02B 6/4497 34/380 |
| 2002/0114609 A1 | 8/2002 | Thebault et al. | | |

* cited by examiner

Primary Examiner — Clark F Dexter
(74) Attorney, Agent, or Firm — Dilworth & Barrese, LLP

(57) ABSTRACT

In a method of removing a protecting synthetic coating (1) from an elongated element (2), the elongated element (2) including an optical fiber (3) surrounded by the coating, a cut (8) is created into the coating by knife edges (6). The element (2) is displaced with respect to the knife edges in a longitudinal direction of the element (2) for displacing coating material (17) by the knives. At least one drop of liquid (12) with wetting properties is supplied to the cut for being sucked into a space created between the coating and the optical fiber during the displacement of the coating for acting as a lubricant for a sliding of the coating to be removed along the fiber.

12 Claims, 4 Drawing Sheets

METHOD FOR REMOVING A COATING

TECHNICAL FIELD OF THE INVENTION

The present invention relates to the technical field of removing a protecting synthetic coating from an elongated element in the form of an optical fibre surrounded by said coating for exposing the outer surface of the fibre as well as apparatuses for carrying out such methods.

Such optical fibres are thin rods, for instance of glass or quartz (silica), usually having a diameter below 1 mm, but may be thicker. The protecting synthetic coating surrounding such optical fibres may be of different nature and thickness, inter alia depending upon in which environment said elongated element or cable is intended to be used.

It is under certain circumstances necessary to remove said protecting synthetic coating from the optical fibre, so-called stripping of the fibre, for exposing the optical fibre, and this is normally carried out at an end of an optical fibre for making it possible to connect it to another optical fibre by welding them together. When removing the coating it is essential to remove all the coating for obtaining the cleanest possible outer surface of the part of the fibre exposed and to not damage the fibre by any scratch or the like, which would degrade the quality of the optical fibre and especially the quality of a weld later obtained for connecting to another such optical fibre.

BACKGROUND ART

The present invention relates to a method according to the above, which comprises the steps of:
a) creating a cut into said coating by cutting with edges of knifes substantially transversely into said coating from at least two substantially opposite directions through a substantial part of the thickness of said coating without reaching said fibre through said knife edges, and
b) displacing said element with respect to said knife edges in the longitudinal direction of said element for displacing coating material by said knives, with respect to the displacement of the element, downstream a position of said cut created by said knife edges away from this position while exposing the fibre surface thereunder,
as well as an apparatus or machine for carrying out such a method.

It is for a method of this type important that said knife edges do not touch the optical fibre, which would result in unacceptable degradation of the quality of the optical fibre in the part thereof exposed by said method. As already stated, it is also crucial to remove all the coating material from the region in question of the optical fibre for obtaining a cleanest possible outer surface thereof. "Through a substantial part of the thickness" does for that sake mean as deep into said coating as necessary for being able to efficiently remove the coating by said displacement. This is material depending and it is mostly desired to not cut deeper than necessary for obtaining this. It may for instance for some coating material be sufficient to cut through only about 30% of the coating thickness. For other about 90% would be required. After the removal of coating material according to step b) in known such methods fragments of coating material still adhere to the outer surface of the fibre, and it is known to remove such fragments by use of a solvent and a cloth, which however inevitably negatively influences the quality of the optical fibre exposed therethrough.

A method of this type is disclosed in US 2002/0114609 A1, in which the optical fibre partially exposed after carrying out the step b) is immersed into a bath of a solvent, whereupon remaining fragments of coating material dissolved thereby are mechanically removed, such as by a cloth. This cloth will have a negative influence upon the quality of the optical fibre exposed.

SUMMARY OF THE INVENTION

The object of the present invention is to provide a method and an apparatus of the type discussed above making it possible to obtain a higher quality of the outer surface of an optical fibre exposed through such a method.

This object is according to the invention obtained by providing such a method with a further step c) of supplying at least one drop of liquid with wetting properties to said cut formed in step a) upstream said knife edges with respect to the direction of said displacement of the knife edges away from the position of said cut for being sucked into a space created between said coating and the optical fibre during said displacement for acting as a lubricant for a sliding of said coating to be removed along the fibre, as well as an apparatus according to the appended independent apparatus claim.

The introduction of said liquid with wetting properties into said space created between said coating and the optical fibre during the relative displacement of said element and the knives will result in an efficient sliding of the entire coating away from the optical fibre without creating fragments of the synthetic material sticking to the outer surface of the fibre and remaining thereon, so that there will be no need to remove such fragments by a solvent and/or a cloth or the like. Any risk of damaging the optical fibre by carrying out said displacement in step b) is also reduced by the lubricating action of said liquid. Thus, the method according to the invention may be carried out without influence by an operator, since the wiping off by a cloth may be omitted, which makes this method faster and more consistent than methods already known.

Thus, the present inventor has understood that a space created between said coating and the optical fibre during said displacement may be used for introducing a liquid with wetting properties thereinto for acting as a lubricant for a sliding of said coating to be removed along the fibre. The liquid will in fact efficiently penetrate into said space thanks to a negative air pressure formed in said space thanks to the volume increase thereof when displacing the knife edges with respect to said element.

According to an embodiment of the invention the method comprises a further step b) of applying a negative air pressure to a region around said cut during and/or after step b) for sucking coating material removed from said element through said displacement and liquid possibly remaining on the optical fibre exposed away from the optical fibre exposed. This facilitates the complete removal of said protecting synthetic coating from the optical fibre to be exposed and ensures that no said liquid remains on the optical fibre. The time period during which the fibre is exposed to said liquid is also shortened by this.

According to another embodiment of the invention one or few drops of said liquid is supplied to said cut in said further step c). It has turned out that only one or a few drops are necessary for obtaining the lubricating action aimed at, and it is then advantageous to only use one or a few drops so as to easily make the liquid used disappear from the outer surface of the fibre exposed.

According to another embodiment of the invention it is an alcohol, preferably isopropyl alcohol, which is supplied as said liquid. An alcohol is suitable to be used as said liquid with wetting properties, especially since it may easily be brought to evaporate from the surface of the optical fibre exposed.

According to another embodiment of the invention said displacement takes place in a substantially vertical direction with a position of said cut moving upwards with respect to said knife edges during the relative displacement thereof. This makes it possible to use also the gravitation for introducing said liquid into said space created between said coating and optical fibre, but it is pointed out that the invention is not restricted to such an orientation of said elongated element, although it may in some applications be favourable.

According to another embodiment of the invention the method comprises a step e) carried out after step b) of cleaving said optical fibre exposed through step b) substantially transversely to the extension thereof at a distance to said position of said cut for forming an end of said element having an exposed part of said optical fibre projecting therefrom. By introducing such a cleaving step in this method the optical fibre is through the method completely prepared for welding to another optical fibre, so that such welding may take place without any substantial delay.

According to another embodiment of the invention at least steps a) and b) are repeated at least once, a new cut formed in step a) thus repeated is created upstream the position of the previous cut, the last time the step a) is carried out a said cut is created close to the previous cut for forming a ring of coating material to be displaced in a subsequent step b), and said liquid is supplied to at least said last cut forming said ring. It has turned out that for some types of synthetic coating material having a tendency to stick firmly to the optical fibre and/or be disintegrated in an unfavourable way during the displacement in step b) a repetition of the steps a) and b) for only removing such a ring of coating material the last time the step b) is carried out is advantageous. This ring will then in step b) slide upon the optical fibre while using said liquid as lubricant and removing any possible fragments of coating material remaining on the parts of the optical fibre exposed through previous performing of steps a) and b).

According to another embodiment of the invention a ring having a height of less than 3 times, preferably less than twice the thickness of a said element is formed the last time the step a) is carried out. It is pointed out that the height of the ring may be even less, such as substantially equal to the thickness of said element or even smaller, and a ring of such a low height will tend to substantially maintain its shape during the displacement thereof along the optical fibre and efficiently act for obtaining the removal of coating material desired.

According to another embodiment of the invention a protecting synthetic coating is removed from a said element having an optical fibre with a diameter below 3 mm.

The object of the present invention is, as already stated, obtained by providing an apparatus according to the description herein, in which the apparatus has means configured to supply at least one drop of liquid with wetting properties to the cut formed in the element held by the holding means. The function of such an apparatus and the advantages thereof appear clearly from the discussion above of the method according to the invention. This does also apply to the embodiment of such an apparatus according to the invention defined in the description herein.

However, it may be mentioned that in one such embodiment said knives are designed to jointly form a funnel-like cavity for receiving said liquid when moving towards each other substantially through the entire thickness of a said coating. This design of said knives facilitates properly introduction of said liquid in said cut for reaching said space created between said coating and the optical fibre during the displacement of the element with respect to the knives, which will facilitate the use of small amounts, such as one or a few drops, of said liquid for obtaining the desired function thereof.

Further advantages as well as advantageous features of the invention appear from the following description.

BRIEF DESCRIPTION OF THE DRAWINGS

With reference to the appended drawings, below follows a specific description of preferred embodiments of the invention cited as examples.

In the drawings.

DETAILED DESCRIPTION OF EMBODIMENTS OF THE INVENTION

Figure 1:
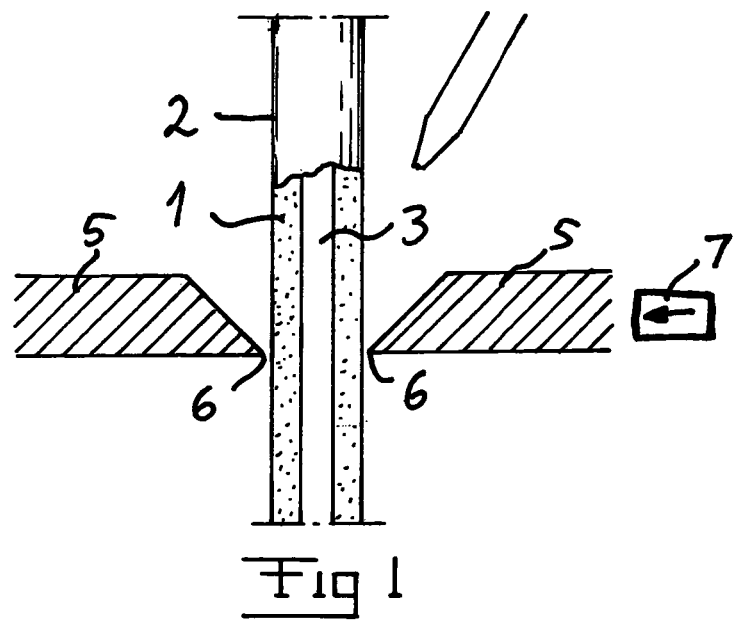
FIG. 1 is a simplified view illustrating an apparatus according to a first embodiment of the invention in a state in which a removal of a protecting synthetic coating from an elongated element in the form of an optical fibre surrounded by said coating is started.
Figure 4:
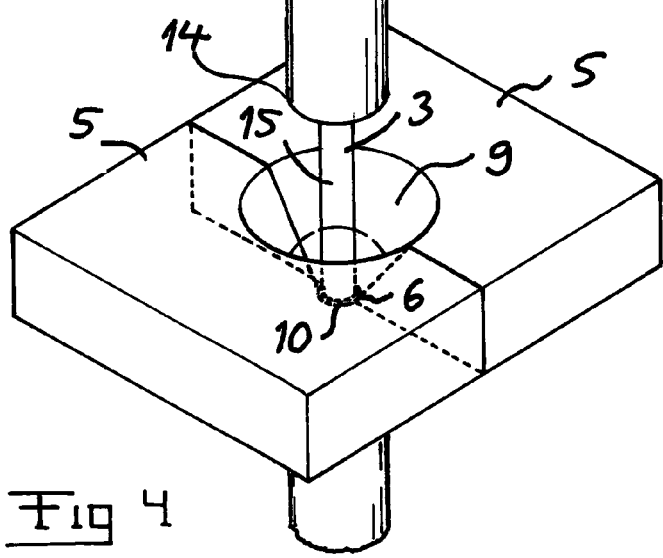
FIG. 4 is a perspective view of the apparatus as shown in FIG. 3.

FIG. 1 illustrates very schematically an apparatus according to an embodiment of the invention for removing a protecting synthetic coating 1 from an elongated element 2 in the form of an optical fibre 3, for instance of glass or quartz, but also other materials are conceivable, surrounded by said coating for exposing the outer surface of the fibre. This apparatus has means 4 configured to hold a said element 2 to be subjected to said removing of coating or stripping of the fibre and two knives 5 with cutting edges 6. The apparatus has also means 7 configured to move said knives with the cutting edges thereof substantially transversely with respect to said element held by said holding means 4 from at least two substantially opposite directions to create a cut 8 (see FIG. 2) into said coating through a substantial part of the thickness of the coating, here substantially through the entire thickness, without reaching said fibre. This is obtained by designing the two knives as illustrated in FIG. 4 to jointly form a funnel-like cavity 9 when moved towards each other into the position according to FIG. 2, in which the edges 6 of the knives together form an opening 10 in said funnel-like cavity with a diameter slightly exceeding the diameter of the optical fibre 3, so that the optical fibre may for example have a diameter of 125 µm and the opening 10 a diameter of 130-150 µm. The optical fibre has in fact mostly a diameter of 50-1500 µm, especially 80-400 µm, but the invention is not restricted to any particular diameter size of a said optical fibre to be stripped.

The apparatus further comprises means 11 indicated by a nozzle configured to supply at least one drop of a liquid 12 (see FIG. 2) with wetting properties, such as an alcohol, for instance isopropyl alcohol, to said cut 8 formed in a said element held by the holding means 4.

The apparatus also comprises an arrangement indicated by a box 13 configured to create a displacement of a said element 2 held by said holding means with respect to said knives 5 in the longitudinal direction of a said element so as to displace coating material downstream, with respect to the displacement of the element, a position 14 (see FIG. 4) of said cut away from this position while exposing the fibre surface 15 thereunder. In the apparatus shown in FIGS. 1-5 the relative displacement of the element and the knives takes place by moving the element, but it is just as well possible to fix the element and move the knives or to move both.

The apparatus further comprises means 16 in the form of a fan or the like configured to create a negative air pressure in a region around said knives so as to suck coating material removed from said element during said displacement and liquid possibly remaining of a said optical fibre exposed away from the optical fibre exposed.

A method of removing a protecting synthetic coating from a said elongated member while using the apparatus according to the embodiment of the present invention shown in FIGS. 1-5 will now be described while referring to these Figures.

Figure 2:
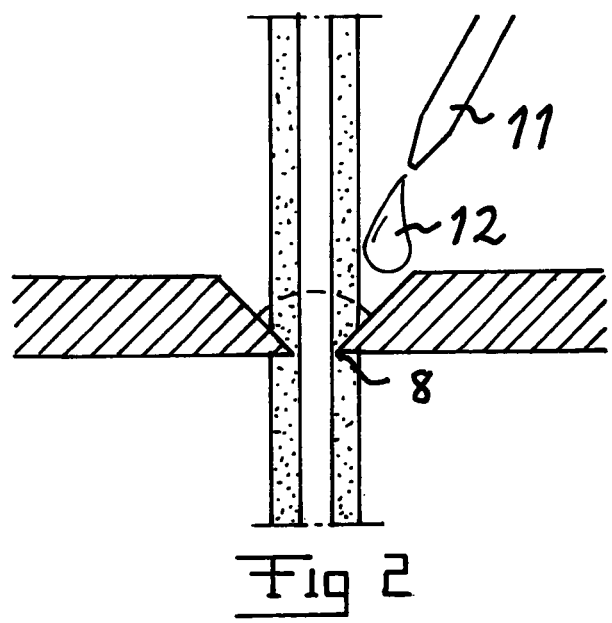
FIG. 2 is a view similar to FIG. 1 of the apparatus in a further step of said method.

It is started from the position shown in FIG. 1, and a cut 8 is created into the coating 1 of the element held by the holding means 4 by cutting with the edges 6 of the knives substantially transversely into the coating from at least two substantially opposite directions through a substantial part of the thickness of said coating without reaching said fibre 3 through said knife edges and arriving to the position shown in FIG. 2.

At least one drop of a liquid 12 with wetting properties is now supplied to said cut 8 upstream said knife edges 6 with respect to the direction of a displacement of the knife edges away from the position 14 of the cut now started.

Figure 3:
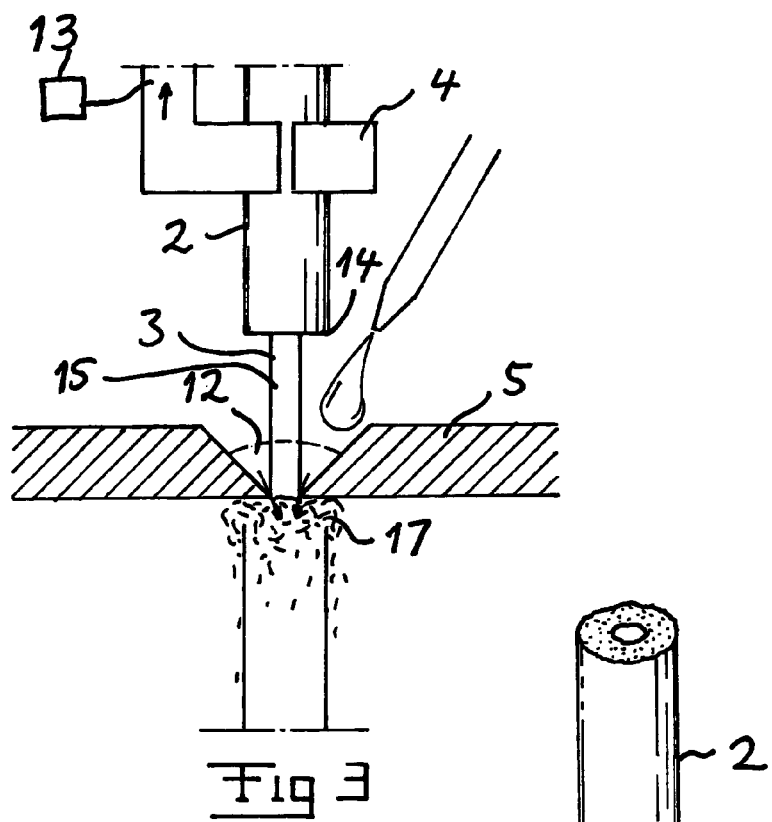
FIG. 3 is a view similar to FIG. 1 of the apparatus in yet another step of said method.

It is shown in FIG. 3 how this results in a displacement of coating material 17 by the knife edges, which results in the creation of a space between said coating and the optical fibre, in which said liquid 12 is sucked for acting as a lubricant for a sliding of said coating to be removed along the fibre. The funnel-like shaped cavity formed by the two knives facilitates the conduction of the liquid into said space formed between the coating and the fibre. The liquid may be supplied only once, when the displacement is started from the position according to FIG. 2, or it may be repeatedly supplied during said displacement.

Figure 5:
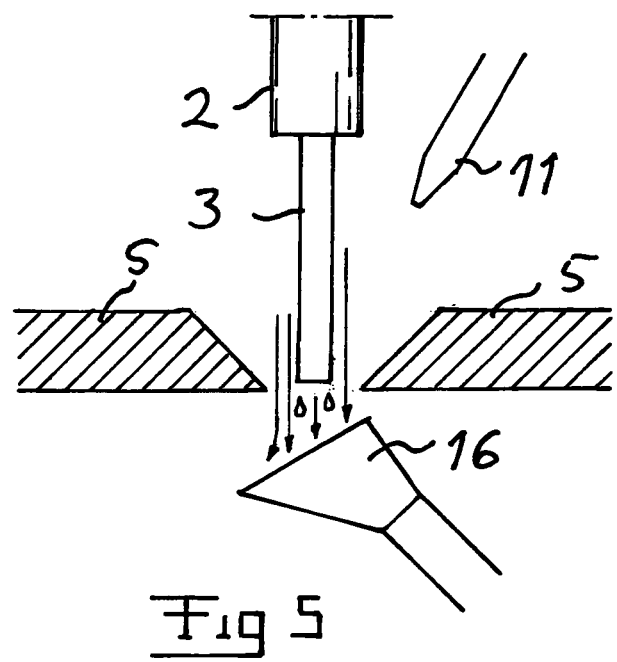
FIG. 5 is a view corresponding to FIG. 1 of the apparatus in a state in which said method has been completed.

When the displacement of the element with respect to the knife edges has displaced the end of the element past the knife edges said protecting synthetic coating will be completely removed from the optical fibre and substantially no liquid will remain on the optical fibre exposed thanks to the small amount of liquid used and the optional sucking action of said means 16. This state of the apparatus is illustrated in FIG. 5.

Figure 6:
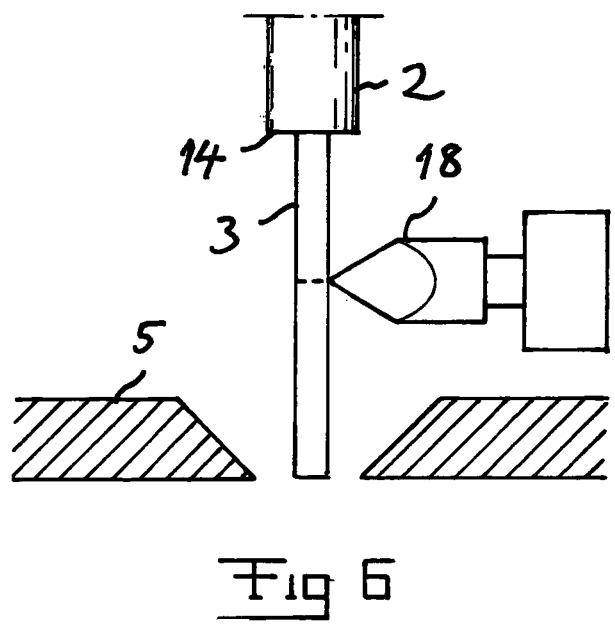
FIG. 6 is a view corresponding to FIG. 1 illustrating an apparatus according to a second embodiment of the invention.

FIG. 6 schematically illustrates an embodiment of the apparatus according to the invention, which also comprises means in the form of a vibrating blade 18 configured to cleave said optical fibre substantially transversely to the longitudinal extension of the fibre 3 at a distance from the position of said cut 8 for creating an end of said element having an exposed part of said optical fibre projecting therefrom, so that this optical fibre will receive a clean end cut for being directly welded to another similar optical fibre if desired. This cleaving means may for instance be of the type shown in WO 2004/001466. This reduces risks of outer influence upon the fibre exposed, since it does not have to be moved between different stations.

Figure 7:
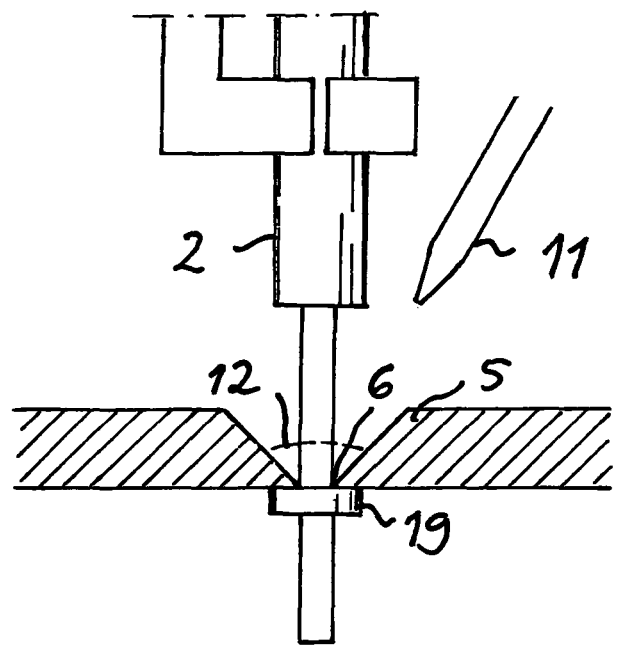
FIG. 7 is a view corresponding to FIG. 3 illustrating a step of a method according to another embodiment of the invention.

A method according to a second embodiment of the present invention will now be described while referring also to FIG. 7. It may for some types of coating material be preferred to repeat the steps a) and b) described above at least once, and this may for instance be done by removing a coating material sleeve with a length of 5 mm, then three further such sleeves with a length of 5 mm, 5 mm and 4 mm, respectively, in the case that coating material over a length of 20 mm is to be removed from said element. The step a) is then carried out for a last time by creating a cut close to the previous cut, in this case at a distance of 1 mm thereto, for forming a ring 19 of coating material to be displaced in a subsequent step b), and said liquid is then supplied to at least said last cut forming said ring. Accordingly, the ring 19 will then be displaced along the optical fibre 3 previously substantially totally exposed while using said liquid as lubricant and removing all fragments of coating material possibly remaining on this part of the optical fibre. It is pointed out that the ring is made as long (high) as possible as long as it is able to fulfil its function according to above. This means that the height thereof is depending upon the material of the coating. The different portions of coating material removed in this way may also be all or a part of them removed at the same time by arranging a plurality of knives mutually space along a said element held so as to obtain a series connection of such knives.

Figure 8:
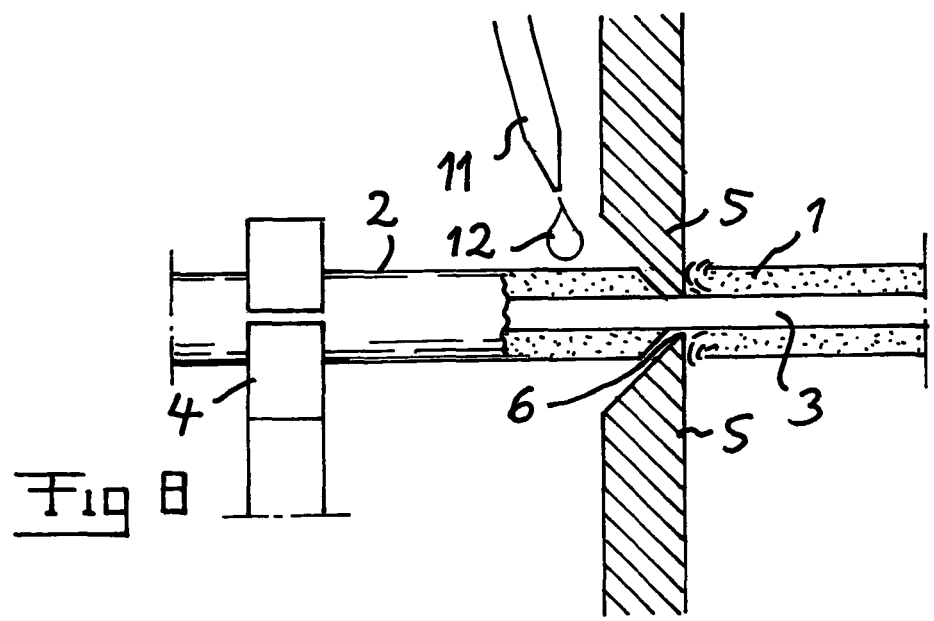
FIG. 8 is a view corresponding to FIG. 2 of an apparatus according to another embodiment of the invention.

FIG. 8 illustrates an apparatus and a method according to a modified embodiment of the present invention, which differs from the teaching of FIGS. 1-7 by the arrangement of the knives so that the relative displacement of the elongated element and the knives takes place in a non-vertical direction, here in a substantially horizontal direction. The negative air pressure formed in said space between the coating and the optical fibre will also in such an embodiment be high enough for efficiently sucking the liquid into this space. Other angles, such as 45°, with respect to the vertical direction are also conceivable.

The invention is of course not in any way restricted to the embodiments thereof described above, but many possibilities to modifications thereof will be apparent to a person with ordinary skill in the art without departing from the basic idea of the invention as defined in the appended claims.

The number of the knives may for instance be different than 2, such as 3, 4, 5, or any other suitable number.

The method according to the invention is also applicable to multiple optical fibres, such as removing the coating from a plurality of said elements attached to a ribbon by at least two knives cutting into these element coatings simultaneously.

Although the stripping of an end of an optical fibre has been described above and shown in the Figures, the invention is also considered to cover stripping of intermediate portions of a fibre, so-called window stripping.

The invention claimed is:

1. A method of removing a protecting synthetic coating (1) from an elongated element (2), the elongated element (2) including an optical fibre (3) surrounded by said coating (1), for exposing an outer surface (15) of the fibre (3), said method comprising the steps of:
   a) creating a cut (8) into said coating (1) by cutting into said coating (1) with edges (6) of knives (5), the knife edges (6) being oriented substantially transversely relative to a longitudinal direction of said elongated element (2), wherein said cutting is from at least two substantially opposite directions through a substantial part of the thickness of said coating (1) without said knife edges (6) reaching said fibre (3) such that said knife edges (6) abut said coating (1), b) displacing a portion of said element (2) with respect to said knife edges (6) in the longitudinal direction of said element (2) as said knife edges (6) abut said coating (1) causing a displacing of said coating (1) by said knives (5) with respect to the displacement of said portion of the element (2), said coating (1) being displaced downstream of a position (14) of said cut (8) created by said knife edges (6) and spaced from said position (14) exposing said outer surface (15) and creating a space between said coating (1) and said outer surface (15) of said optical fibre (3), c) supplying at least one drop of liquid (12) with wetting properties to said cut (8) formed in step a) upstream of said knife edges (6) with respect to the direction of displacement of said coating (1) and longitudinally away from the position (14) of said cut (8), and d) causing said liquid (12) to be sucked into the space created between said coating (1) and the optical fibre (3) by said displacing of said coating, said liquid (12) acting as a lubricant for sliding of said coating (1) to be removed along the fibre (3) and for removing the coating (1) away from the optical fibre (3) without coating fragments sticking to the outer surface (15) of the optical fibre (3).

2. A method according to claim 1, wherein negative air pressure is applied to a region around said cut during and/or after step b) for sucking coating material (17) removed from said element (2) through said displacement and any liquid remaining on the exposed optical fibre (3).

3. A method according to claim 1, wherein several drops of said liquid (12) are supplied to said cut (8) in said step c).

4. A method according to claim 1, wherein said liquid (12) comprises an alcohol.

5. A method according to claim 4, wherein said alcohol is isopropyl alcohol.

6. A method according to claim 1, wherein said displacement takes place in a substantially vertical direction with a position (14) of said cut (8) moving upwards with respect to said knife edges (6) during the relative displacement thereof.

7. A method according to claim 1, additionally comprising a step e) carried out after step b) of cleaving said optical fibre (3) exposed through step b) substantially transversely to the extension thereof at a distance to said position (14) of said cut (8) for forming an end of said element having an exposed part of said optical fibre projecting therefrom.

8. A method according to claim 1, wherein at least steps a) and b) are repeated at least once, a new cut formed in step a) thus repeated is created upstream of the position of the previous cut, the last time the step a) is carried out said cut is created close to the previous cut for forming a ring (19) of coating material to be displaced in a subsequent step b), and said liquid (12) is supplied to at least said last cut forming said ring.

9. A method according to claim 8, wherein the ring (19) has a height of less than 3 times the thickness of said element (2).

10. A method according to claim 9, wherein said height is less than two times the thickness of said element (2).

11. A method according to claim 1, wherein said optical fibre (3) has a diameter less than 3 mm.

12. A method according to claim 1, wherein the entire coating (1) slides away from the optical fibre (3) without the coating fragments sticking to the outer surface (15) of the optical fibre (3).

* * * * *